(12) United States Patent
Nagarajan et al.

(10) Patent No.: US 11,979,781 B2
(45) Date of Patent: May 7, 2024

(54) METHOD FOR SELECTING CELL USING A 5G USER EQUIPMENT AND A 5G UE

(71) Applicant: Samsung Electronics Co., Ltd., Suwon-si (KR)

(72) Inventors: Shanthossh Nagarajan, Bengaluru (IN); Rishav Agarwal, Bengaluru (IN); Shouvik Guha, Bengaluru (IN); Sumit Verma, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/696,155

(22) Filed: Mar. 16, 2022

(65) Prior Publication Data

US 2022/0295360 A1    Sep. 15, 2022

Related U.S. Application Data

(63) Continuation of application No. PCT/KR2022/003077, filed on Mar. 4, 2022.

(30) Foreign Application Priority Data

Mar. 11, 2021  (IN) .............................. 202141010370
Sep. 9, 2021  (IN) .............................. 2021 41010370

(51) Int. Cl.
*H04W 36/00*    (2009.01)
*H04W 36/30*    (2009.01)

(52) U.S. Cl.
CPC ... *H04W 36/0061* (2013.01); *H04W 36/0083* (2013.01); *H04W 36/30* (2013.01)

(58) Field of Classification Search
CPC ......... H04W 36/0061; H04W 36/0083; H04W 36/30

(Continued)

(56) References Cited

U.S. PATENT DOCUMENTS 10,178,585 B2    1/2019  Huang-Fu et al.
10,542,137 B1 *  1/2020  Sial .................. H04M 1/571
(Continued)

FOREIGN PATENT DOCUMENTS

CN       110677861 A     1/2020
JP     2020-025213 A    12/2020
(Continued)

OTHER PUBLICATIONS

International Search Report dated Jun. 16, 2022, issued an International Application No. PCT/KR2022/003077.
(Continued)

*Primary Examiner* — Joel Ajayi
(74) *Attorney, Agent, or Firm* — Jefferson IP Law, LLP

(57) ABSTRACT

A method for selecting cell using a fifth generation (5G) user equipment (UE) is provided. The method includes detecting an event, when the 5G UE is camped on a serving cell; detecting availability of one or more voice over new radio (VoNR) cells and one or more non-VoNR cells in vicinity of the serving cell in response to detecting the event; based on the event, performing one of (i) selecting a VoNR cell when only one VoNR cell is available, (ii) identifying and selecting a VoNR cell based on a plurality of cell parameters, when a plurality of VoNR cells are available, and (iii) identifying and selecting a non-VoNR cell from the one or more non-VoNR cells, based on the plurality of cell parameters, when one of the one or more non-VoNR cells is available.

15 Claims, 15 Drawing Sheets

(58) Field of Classification Search
USPC .......................................................... 455/436
See application file for complete search history.

(56) References Cited

U.S. PATENT DOCUMENTS

| | | |
|---|---|---|
| 2010/0329244 A1 | 12/2010 | Buckley et al. |
| 2019/0297538 A1 | 9/2019 | Keller et al. |
| 2019/0394688 A1 | 12/2019 | Zhu et al. |
| 2020/0053134 A1 | 2/2020 | Niemi et al. |
| 2020/0100309 A1 | 3/2020 | Jha et al. |
| 2020/0112892 A1 | 4/2020 | Shi et al. |
| 2020/0252839 A1 | 8/2020 | Tang |
| 2020/0314702 A1 | 10/2020 | Rahman |
| 2020/0351726 A1 | 11/2020 | Chauhan et al. |
| 2020/0374833 A1 | 11/2020 | Guo et al. |
| 2021/0195470 A1* | 6/2021 | Lei .................... H04W 36/0022 |

FOREIGN PATENT DOCUMENTS

| | | |
|---|---|---|
| KR | 10-1412732 B1 | 7/2014 |
| KR | 10-2019-0111767 A | 10/2019 |
| KR | 10-2020-0024453 A | 3/2020 |
| KR | 10-2020-0135164 A | 12/2020 |
| WO | 2018/065936 A1 | 4/2018 |
| WO | 2018/232560 A1 | 12/2018 |

OTHER PUBLICATIONS

Indian Office Action Sep. 21, 2023, issued in Indian Application No. 202141010370.

* cited by examiner

FIG. 5C

| MCC/MNC | | PCI/ARFCN DETAILS OF CELLS | | GPS LONGITUDE | GPS LATITUDE | VONR/ EPSFB | CDRX SUPPORT | SPS SUPPORT | BWP SWITCH SUPPORT | VALIDITY |
|---|---|---|---|---|---|---|---|---|---|---|
| 001 | 01 | 45, 12, ETC | 66563, 41365, ETC | 47.451739 | -121.762784 | VONR | NO | NO | NO | VALID |
| 122 | 35 | 55, 22, ETC | 65932, 71634, ETC | 39.010912 | -94.517162 | EPSFB | YES | YES | YES | STALE |
| 310 | 230 | 56, 88, ETC | 56935, 66895, ETC | 30.284416 | -81.398216 | VONR | YES | YES | YES | VALID |

METHOD FOR SELECTING CELL USING A 5G USER EQUIPMENT AND A 5G UE

CROSS-REFERENCE TO RELATED APPLICATION(S)

This application is a continuation application, claiming priority under § 365(c), of an International application No. PCT/KR2022/003077, filed on Mar. 4, 2022, which is based on and claims the benefit of an Indian provisional patent application number 202141010370, filed on Mar. 11, 2021, in the Indian Patent Office, and of an Indian Complete patent application number 202141010370, filed on Sep. 9, 2021, in the Indian Patent Office, the disclosure of each of which is incorporated by reference herein in its entirety.

TECHNICAL FIELD

The disclosure relates to telecommunication. More particularly, the disclosure relates to a method for selecting cell using a Fifth Generation (5G) User Equipment (UE) and a 5G UE.

BACKGROUND ART

Voice over New Radio (VoNR) is the practice of packetizing Voice over the Internet Protocol (VoIP) and transporting signaling and media components over a 5G user plane. VoNR is Third Generation Partnership Project (3GPP) standard based technology that provides real-time services over NR mobile networks. Mobile network operators deploy the VoNR services on existing spectrum in a phased manner Since the deployment is in phased manner, only few bands and cells support the VoNR services. UEs supporting the VoNR can avail the VoNR services on all available bands. However, a network cannot provide the VoNR services over all the bands due the phased deployment of VoNR services. Hence, the UEs with VONR support gets latched to cells which do not support the VoNR services (also referred as non-VoNR cells). When the UE supports the VoNR services i.e., the user equipment is a Fifth Generation (5G) UE and the network doesn't support the VoNR services, an active call on the 5G UE will be re-direct to Voice over Long-Term Evolution (VoLTE). This process of re-directing the call to the VoLTE, when the network doesn't support the VoNR services is referred as Evolved Packet System Fallback (EPSFB). This process affects call quality due to shift from VoNR to VoLTE mobility, which causes latency. Also, this shifting leads to increased power consumption.

In the existing 5G Standalone (SA) deployments, the network informs the availability of voice services on a cell to the 5G UE during registration procedure. The network sends Information Elements (IEs) indicating the availability of voice services, in response to a registration request by the 5G UE. However, information included in the IEs does not indicate whether cells associated with the network support the VoNR services or the EPSFB services. Hence, the 5G UE does not have information whether the cell has the VoNR support. Therefore, the 5G UE may select the non-VoNR cell which re-directs the call to the VoLTE via EPSFB, causing the latency and increased power consumption. Also, power conservation must be implemented to optimize selecting the cell. In the existing systems, the 5G UE doesn't have information related to support of power saving features of a cell, before camping on the cell. Hence, there is a need to overcome one or more limitations of the above-described systems to optimize selecting the cell in 5G communication networks.

The above information presented as background information is only to assist with an understanding of the disclosure. No determination has been made, and no assertion is made, as to whether any of the above might be applicable as prior art with regard to the disclosure.

DISCLOSURE OF INVENTION

Aspects of the disclosure are to address at least the above-mentioned problems and/or disadvantages and to provide at least the advantages described below. Accordingly, an aspect of the disclosure is to provide method for selecting cell using a Fifth Generation (5G) User Equipment (UE) and a 5G UE.

Additional aspects will be set forth in part in the description which follows and, in part, will be apparent from the description, or may be learned by practice of the presented embodiments.

In accordance with an aspect of the disclosure, a method for selecting cell using a Fifth Generation (5G) User Equipment (UE) is provided. The method includes detecting an event, when the 5G UE is camped on a serving cell. Further, the method comprises detecting availability of one or more Voice over New Radio (VoNR) cells and one or more non-VoNR cells in vicinity of the serving cell in response to detecting the event. Furthermore, the method comprises based on the event, performing one of (i) selecting a VoNR cell when only one VoNR cell is available, (ii) identifying and selecting, by the 5G UE, a VoNR cell based on a plurality of cell parameters, when a plurality of VoNR cells are available, and (iii) identifying and selecting a non-VoNR cell from the one or more non-VoNR cells, based on the plurality of cell parameters, when one of the one or more non-VoNR cells is available.

In accordance with another aspect of the disclosure, a Fifth Generation (5G) User Equipment (UE) is provided. The processor is configured to detect an event, when the 5G UE is camped on a serving cell. Further, the processor is configured to detect availability of one or more Voice over New Radio (VoNR) cells and one or more non-VoNR cells in vicinity of the serving cell in response to detecting the event. Furthermore, the processor is configured to, based on the event, perform one of (i) selecting a VoNR cell when only one VoNR cell is available, (ii) identifying and selecting, by the 5G UE, a VoNR cell based on a plurality of cell parameters, when a plurality of VoNR cells are available, and (iii) identifying and selecting a non-VoNR cell from the one or more non-VoNR cells, based on the plurality of cell parameters, when one of the one or more non-VoNR cells is available.

In accordance with another aspect of the disclosure, a computer-implemented method of generating a list for selecting cell using a 5G UE is provided. The computer-implemented method includes recording voice support and a plurality of cell parameters for each cell camped on by the 5G UE. The voice support comprises one of, VoNR support and VoLTE support. The method of generating the list for selecting cell using the 5G UE is performed by a computer system comprising a processor, a memory, and a communication interface.

The foregoing summary is illustrative only and is not intended to be in any way limiting. In addition to the illustrative aspects, embodiments, and features described above, further aspects, embodiments, and features will become apparent by reference to the drawings and the following detailed description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5C shows a list generated by a 5G UE, according to an embodiment of the disclosure;

The same reference numerals are used to represent the same elements throughout the drawings.

Figure 1:
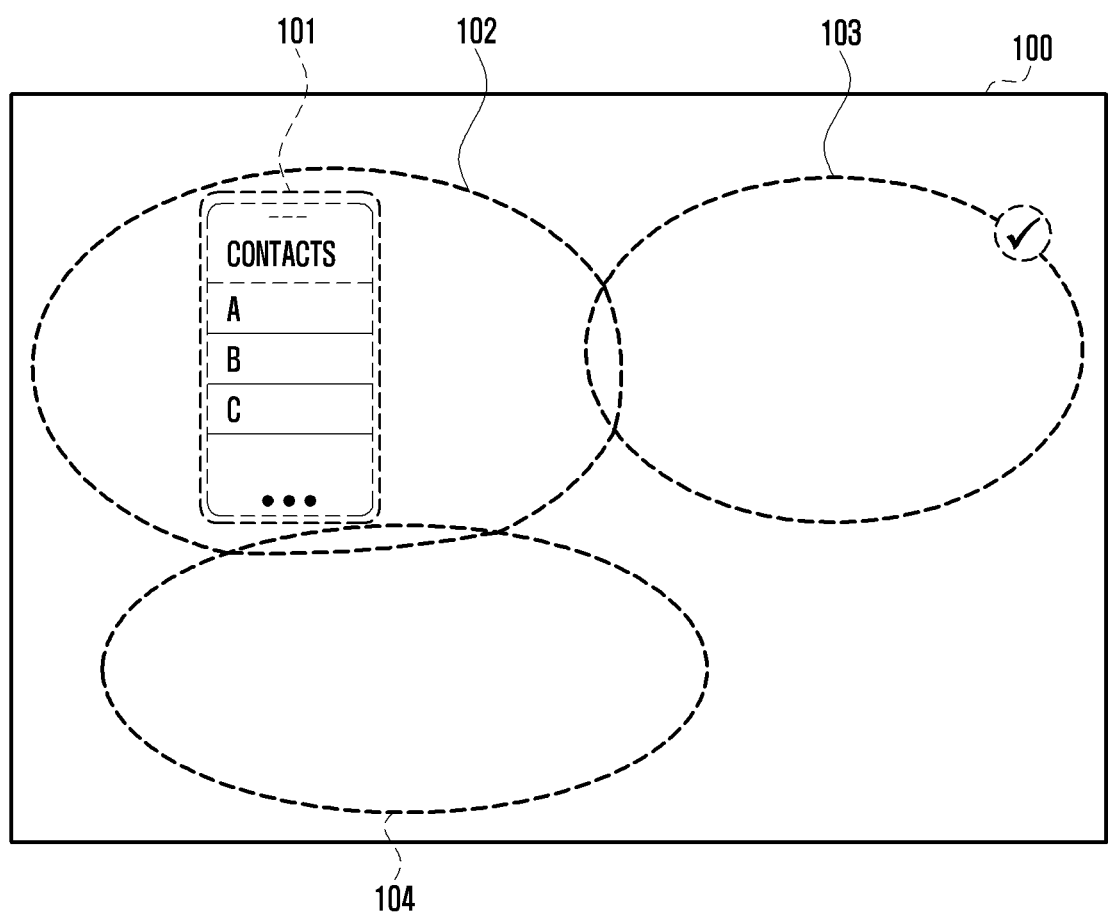
FIG. 1 illustrates an environment for selecting cell using a Fifth Generation (5G) User Equipment (UE), according to an embodiment of the disclosure.

It should be appreciated by those skilled in the art that any block diagram herein represents conceptual views of illustrative systems embodying the principles of the subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the document, the word "exemplary" is used herein to mean "serving as an example, instance, or illustration." Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the disclosure relate to a method for selecting cell using a Fifth Generation (5G) User Equipment (UE). The disclosure provides a method for selecting an optimized cell using the 5G UE. When the 5G UE is camped on a serving cell, an event indicating requirement of voice services is detected. The disclosure provides method in which the 5G UE can detect availability of Voice over New Radio (VoNR) cells or non-VoNR cells in vicinity of the serving cell is detected, upon detecting the event. Hence, the 5G UE can determine a cell that supports VoNR services and camp on to the cell. This avoids latency caused by the EPSFB and associated call drop. Further, the disclosure provides method to select a cell based on cell parameters associated with the cell such as power-saving features, signal power parameters, and the like. When multiple cells supporting the VoNR services are detected, a cell from the multiple cells is selected based on the cell parameters. Hence, power saving is optimized by selecting the cell based on the power-saving features. Further, the 5G UE can identify the cell that provides non-VoNR services and camp on to the cell, based on the requirement. Hence, the disclosure provides methods to optimize cell selection. Also, the disclosure provides flexibility to the 5G UE in the cell selection. The 5G UE can easily prioritize the cells that have VoNR support and camp on them to avoid unintended delay/latency introduced during voice services.

FIG. 1 illustrates an environment 100 for selecting cell using a 5G UE, according to an embodiment of the disclosure.

The environment 100 comprises a 5G UE 101, a serving cell 102, a VoNR cell 103, and a non-VoNR cell 104. The 5G UE 101 may be a handheld device associated with a user. For example, the 5G UE 101 may be a smartphone, a tablet, and the like. The 5G UE 101 may be any computing device such as a laptop computer, a desktop computer, a Personal Computer (PC), a notebook, a smartphone, a tablet, e-book readers, a server, a network server, a cloud-based server, and the like. Further, the 5G UE 101 may support 5G services such as voice call services, video call services, messaging services, data services and the like. Particularly, the 5G UE 101 may support voice (VoNR and VoLTE) services. The 5G UE 101 may be camped on the serving cell 102. In an example, the serving cell 102 may be a cell in a standalone 5G coverage area. In another example, the serving cell 102 may be in Fourth-Generation (4G) coverage area. The standalone 5G cell is operated at millimeter wave band (24 GHZ-52 GHz) and provides enhanced voice services. However, the 4G cell may be operated at legacy 4G bands or enhanced sub 6 GHz bands (450 MHz-6 Ghz). In the example, when the serving cell 102 is in the 5G coverage area, the serving cell 102 may be one of, a femtocell, picocell, and a microcell. The serving cell 102 may comprise multiple cells in the vicinity of the serving cell 102. The environment 100 shows the VoNR cell 103 and the non-VoNR cell 104 in vicinity of the serving cell 102. In the description, a cell which supports VoNR services (also referred as the cell having VoNR support) is referred as the VoNR cell 103. A cell which does not support the VoNR services is referred as the non-VoNR cell 104 in the description. FIG. 1 shows one VoNR cell 103 and one non-VoNR cell 104. There may be multiple VoNR cells and non-VoNR cells in vicinity (for example, within a range of 10m) of the serving cell 102. One or more VoNR cells in the vicinity of the serving cell 102 are referred as one or more VoNR cells 103. Further, one or more non-VoNR cells in the vicinity of the serving cell 102 are referred as one or more non-VoNR cells 104.

A network operator associated with the 5G UE 101 may not provide the VoNR services on all cells. In such cases, the disclosure provides a method for selecting an optimized cell using the 5G UE 101. The 5G UE 101 may detect an event, when the 5G UE 101 is camped on the serving cell 102. The event may indicate a requirement of voice services. FIG. 1 shows example of an event detected by the 5G UE 101. The user associated with the 5G UE 101 may open contact list and may scroll through names (for example, A, B, C). The 5G UE 101 may detect that the user may call another person in the contact list. Further, the 5G UE 101 may detect availability of the one or more VoNR cells 103 and the one or more non-VoNR cells 104 in vicinity of the serving cell 102 in response to detecting the event. The 5G UE 101 may detect the availability to select an optimal cell for the call. The 5G UE 101 may detect the availability of the one or more VoNR cells 103 and the one or more non-VoNR cells 104 based on a list. The list may comprise voice support, the plurality of cell parameters, and cell details of each of the one or more VoNR cells 103 and the one or more non-VoNR cells 104.

Further, the 5G UE 101 may perform one of the below-mentioned steps, based on the event. The 5G UE 101 may select a VoNR cell when only one VoNR cell is available.

Further, the 5G UE 101 may identify and select a VoNR cell based on a plurality of cell parameters, when a plurality of VoNR cells are available. The plurality of cell parameters may comprise power-saving features of the plurality of VoNR cells, signal power parameters of the plurality of VoNR cells, and the like. Furthermore, the 5G UE 101 may identify and select a non-VoNR cell from the one or more non-VoNR cells 104, based on the plurality of cell parameters, when one of, non-VoNR cell is available and based on the event. The event may indicate a requirement of voice services. In some embodiments, the event may indicate to use a non-VoNR cell to avoid network congestion in VoNR supported cells. For example, when only one VoNR cell is available in a cluster of cells, many 5G UEs may camp on the VoNR supported cell and cause network congestion. Hence, in such scenarios, to avoid network congestion, the network may prioritize the non-VoNR cell over the VoNR cell.

Referring to FIG. 1, the serving cell 102 may have only one VoNR cell 103 in the vicinity. When, the serving cell 102 may not have the non-VoNR support, the 5G UE 101 selects the VoNR cell 103 for establishing or continuing the call.

Figure 2A:
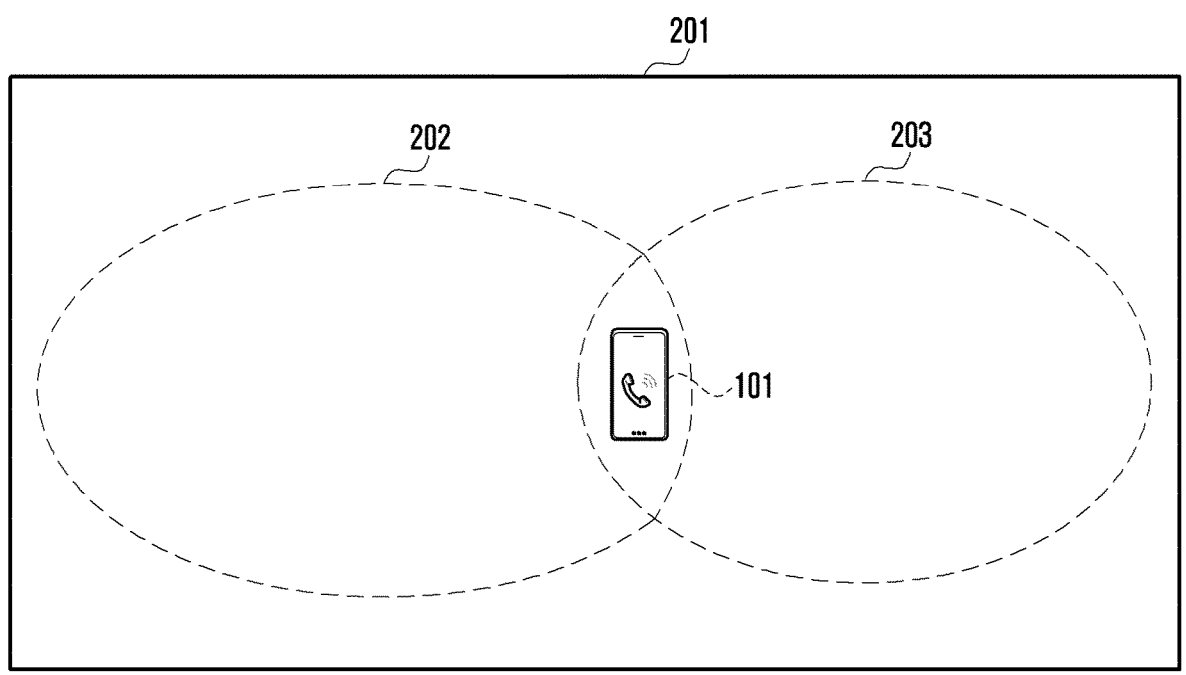
FIGS. 2A and 2B show scenarios illustrating selection of a non-VoNR cell when a 5G UE requires VoNR services, in existing methods according to various embodiments of the disclosure.
Figure 2B:
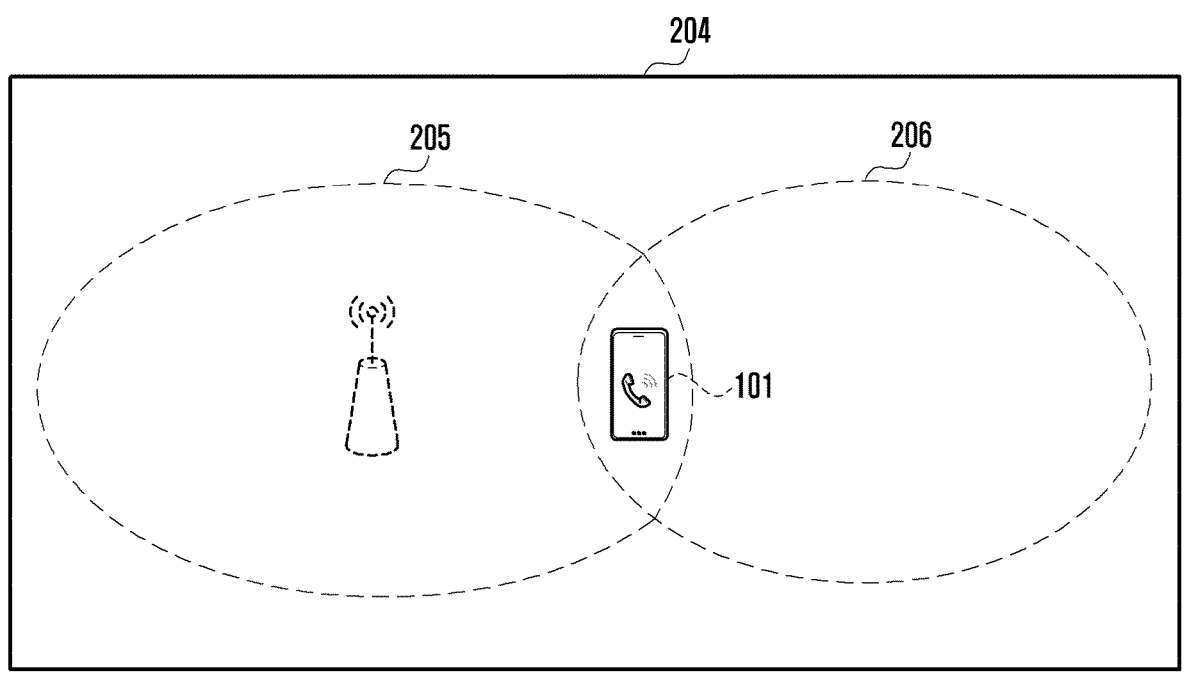

FIGS. 2A and 2B show scenarios 201 and 204 illustrating selecting a non-VoNR cell when the 5G UE 101 requires the VoNR services, in existing methods according to various embodiments of the disclosure.

The scenario 201 of FIG. 2A illustrates that has an ongoing voice call on a VoNR cell 202. In the existing systems, the 5G UE 101 doesn't have information on whether a cell supports VoNR, before camping on the cell. The 5G UE 101 receives the information from the network after camping on to the cell. The 5G UE 101 selects the non-VoNR cell 203 when moving from the VoNR cell 202 to the non-VoNR cell 203. The voice call is re-directed to VoLTE via EPSFB process. This causes latency and affects call quality and the call may be dropped.

The scenario 204 of FIG. 2B illustrates the 5G UE 101 that has an ongoing VoWi-Fi call. The 5G UE 101 is in Wi-Fi coverage on a 5G cell 205. The 5G UE 101 selects the non-VoNR cell 203 when moving out of the Wi-Fi coverage, from the 5G cell 205 to the non-VoNR cell 206, when the 5G cell 205 does not have the VoNR support. The voice call is re-directed to VoLTE via EPSFB process. This causes latency and affects call quality and call may be dropped. In another example, the 5G UE 101 may be camped on 4G Long-Term Evolution (LTE) cell and VoWi-Fi/VoLTE call may be ongoing. The 5G UE 101 may move out of coverage of the 4G LTE cell and select a non-VoNR cell, which leads to EPSFB.

Figure 2C:
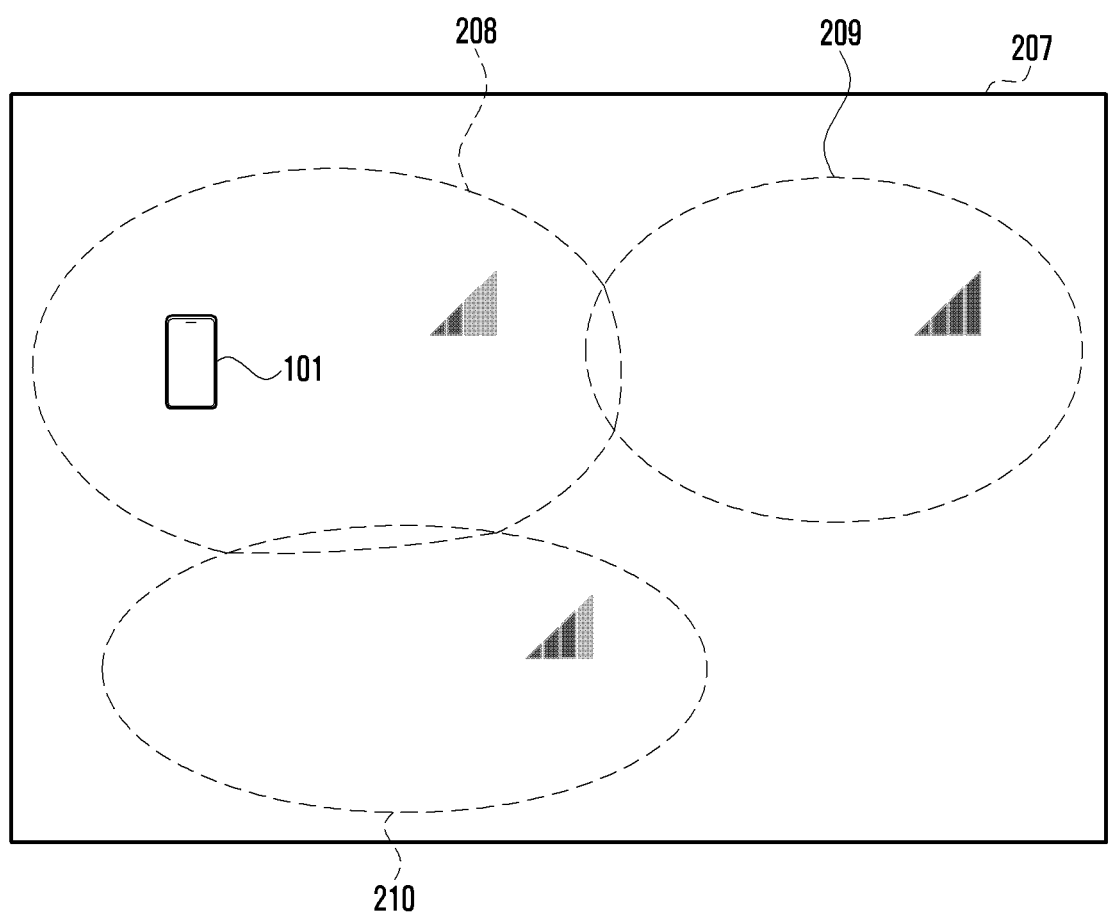
FIG. 2C illustrates a scenario when a 5G UE is camped on a serving cell, in existing methods according to an embodiment of the disclosure.

FIG. 2C illustrates a scenario 207 when the 5G UE 101 is camped on a serving cell 208, in existing methods according to an embodiment of the disclosure.

Referring to FIG. 2C, the serving cell 208 may have the VoNR support. A VoNR cell 209 and a VoNR cell 210 are in vicinity of the serving cell 208. A signal power associated with the serving cell 208 is less compared to a signal power associated with the VoNR cell 209 and the VoNR cell 210. Further, the serving cell 208 may not support any power-saving features. The power-saving features may comprise Bandwidth Part (BWP) switching feature, Connected mode Discontinuous Reception (CDRX), Semi-Persistent Scheduling (SPS), and the like. The VoNR cell 209 and the VoNR cell 210 may support three power-saving features and two power-saving features respectively. In the scenario 207, the 5G UE 101 is camped on the serving cell 208, when the VoNR cell 209 and the VoNR cell 210 with better cell parameters are available in vicinity of the serving cell 208.

Figure 3:
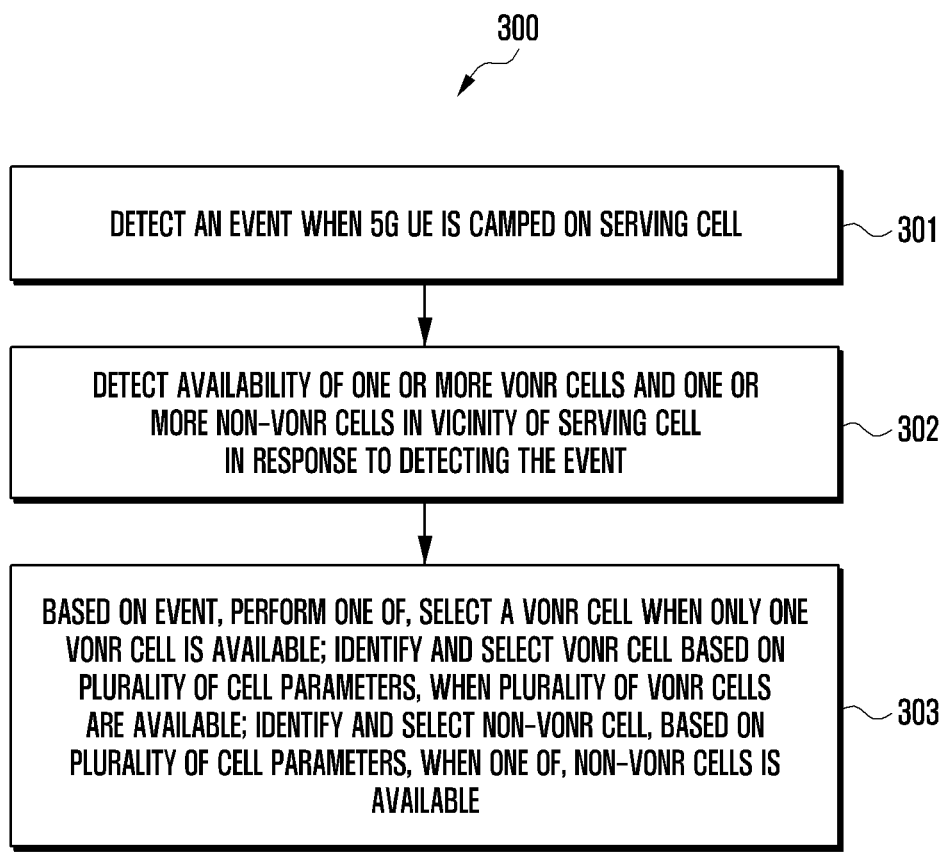
FIG. 3 illustrates a flow chart illustrating method operations for selecting a cell using a 5G UE, according to an embodiment of the disclosure.

FIG. 3 shows a flow chart illustrating method operations for selecting cell using the 5G UE 101, according to an embodiment of the disclosure.

Referring to FIG. 3, the method 300 may comprise one or more operations. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 301, the 5G UE 101 detects the event, when the 5G UE 101 is camped on the serving cell 102. The event may indicate a requirement of voice services. In an embodiment, the 5G UE 101 may be configured to detect the event among a set of events indicating the requirement of voice services. The 5G UE 101 may identify a sequence of actions performed on the 5G UE 101 by the user associated with the 5G UE 101. The sequence of actions may correspond to an event in the set of events. The sequence of actions and corresponding events may be stored in a memory of the 5G UE 101.

Figure 4:
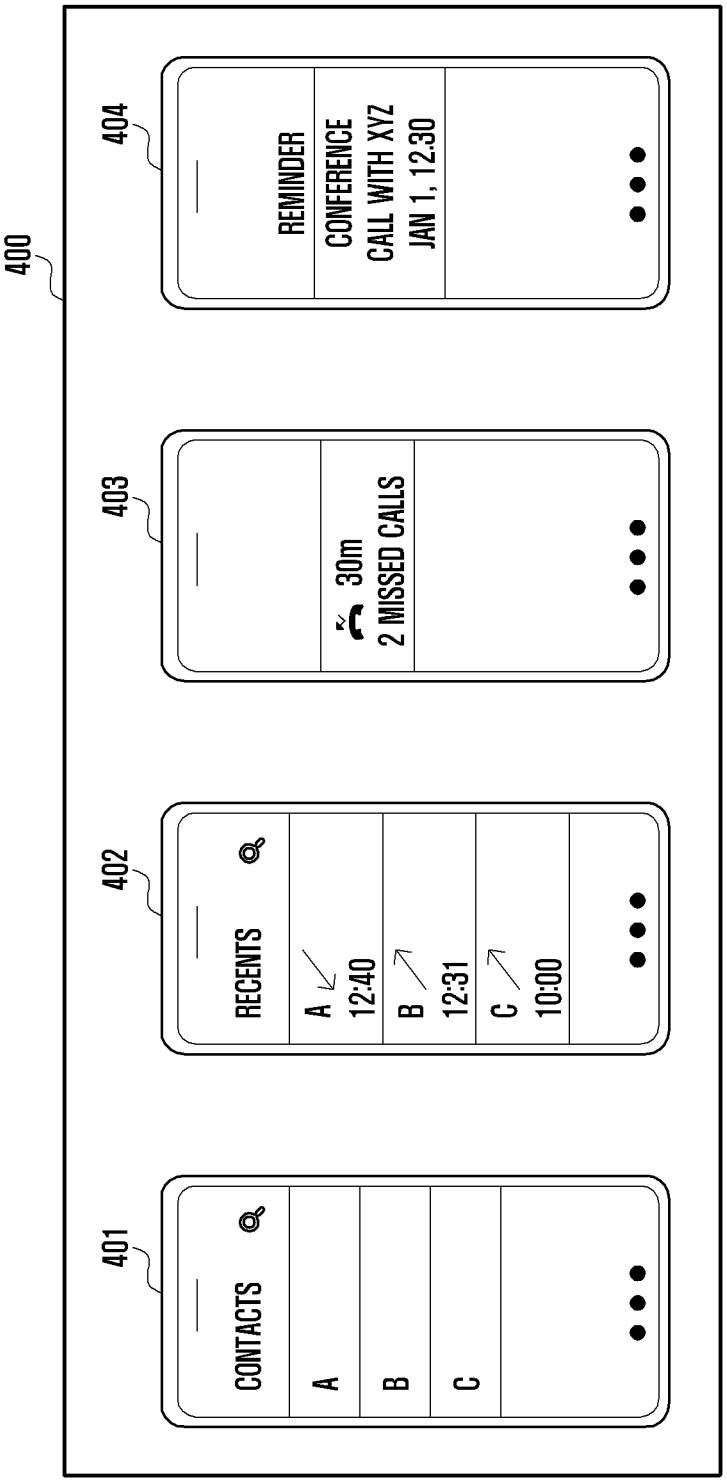
FIG. 4 shows a set of events indicating requirement of voice services, according to an embodiment of the disclosure.

FIG. 4 shows a set of events indicating requirement of voice services, according to an embodiment of the disclosure.

Referring to FIG. 4, 400 shows a set of events indicating the requirement of voice services. Event 401 may be associated with the sequence of actions such as opening a contact list in the 5G UE 101 and search for a name Event 402 may be associated with an action such as scrolling through a call history in the 5G UE 101. Event 403 may be associated with the sequence of actions such as unlocking the 5G UE 101 and viewing missed call notifications. Event 404 may be the user getting an event reminder (for example, meeting, call schedule, birthday) from calendar. Other events (not shown in FIGS.) may include user searching a particular person/restaurant/hospital/shop contact in internet and/or clicks on the phone number from browser/applications in the 5G UE 101. All the above-mentioned events may indicate the requirement of voice services. The detection of the event prior to selecting the cell will ensure that the VoNR cell is selected only when there is a requirement. This reduces congestion on the VoNR cells. The above examples should not be considered as limitation and are only examples. The event can include any action performed on the 5G UE 101 that indicates a requirement of voice services.

Referring back to FIG. 3, at operation 302, the 5G UE 101 detects availability of the one or more VoNR cells 103 and the one or more non-VoNR cells 104 in vicinity of the serving cell 102. The 5G UE 101 may detect availability of the of the one or more VoNR cells 103 and the one or more non-VoNR cells 104, upon detecting that the 5G UE 101 may require the voice services. The 5G UE 101 may scan frequencies associated with cells in the vicinity of the serving cell 102. The 5G UE 101 may detect the availability of the one or more VoNR cells 103 and the one or more non-VoNR cells 104 based on a list stored in the memory of the 5G UE 101. The list may comprise the voice support, the plurality of cell parameters, the cell details of each of the one or more VoNR cells 103 and the one or more non-VoNR cells 104, and the like. The voice support in the list indicates whether the cell supports voice services i.e., whether the cell has the VoNR support or VoLTE support. The cell details may comprise Mobile Country Code (MCC), Mobile Network Code (MNC), Physical cell ID (PCI), Absolute Radio-Frequency Channel Number (ARFCN), Global Positioning System (GPS) coordinates, and the like. In an embodiment, the list may be generated by the 5G UE 101. In further embodiment, the list may be generated by the 5G UE 101 using information provided from a network server.

Figure 5A:
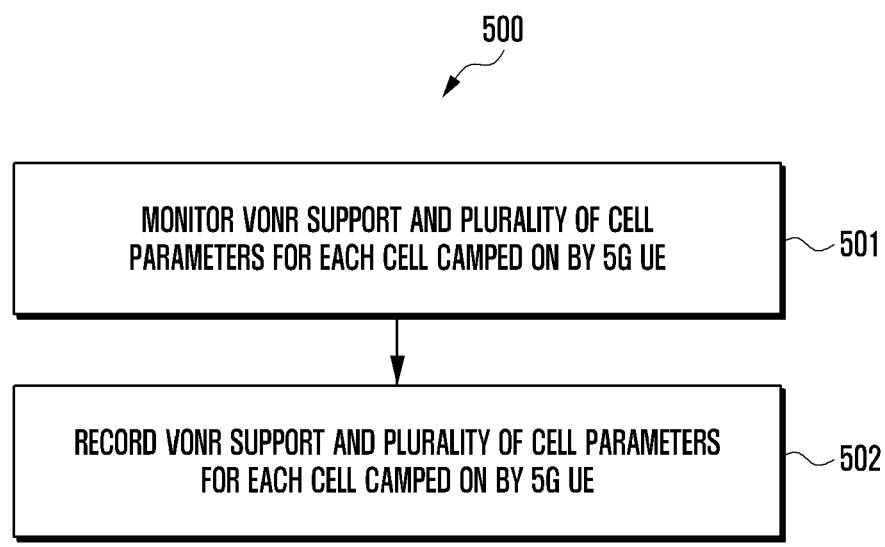
FIGS. 5A and 5B show various flow chart illustrating method operations for generating a list by a 5G UE, according to various embodiments of the disclosure.

FIG. 5A shows a flow chart 500 illustrating method operations for generating the list by the 5G UE 101 according to an embodiment of the disclosure.

Referring to FIG. 5A, at operation 501, the 5G UE 101 monitors the voice support and the plurality of cell parameters for each cell camped on by the 5G UE 101. The 5G UE 101 may send a registration request to the network server while initiating a first call made on a cell. The network server sends a response to the 5G UE 101. The 5G UE 101 may determine whether the cell camped on by the 5G UE 101 supports voice services, based on the response. Further, the 5G UE 101 may determine whether the cell camped on the by 5G UE 101 supports the VoNR or the EPSFB, after camping on the cell. Further, the 5G UE 101 may receive the plurality of cell parameters such as power-saving features, signal power parameters, and the like, for the cell camped by the 5G UE 101. The 5G UE 101 may receive Radio Resource Control (RRC) configuration message from the network server after camping on the cell. The RRC configuration message may comprise the power-saving features of the cell. The power saving features may comprise BWP switching feature, CDRX, SPS, and the like. The BWP switching is division of entire bandwidth of the cell into chunks, so that low-bandwidth applications (for instance VoNR) may use only required smaller bandwidth, rather than using up the entire huge spectrum. This helps to save power by unnecessary Physical downlink control channel (PDCCH) monitoring over the entire bandwidth. The CDRX may allow the 5G UE 101 to sleep at pre-defined periodic intervals when the network server will not allocate any downlink data to the 5G UE 101. For call-based services like VoNR, packet size is very small (in terms of kb) but inter-arrival time, or the periodicity of packet arrival is small and consistent, for example, 20 ms. The overload on the Radio Access Network (RAN) to support control signal for such services for multiple UE is very high. Hence, resources are configured or allocated once to the 5G UE 101 for using periodically, instead of configuring at every interval. This is known as the SPS. When the 5G UE 101 selects a cell that supports the SPS for VoNR, power is saved by avoiding PDCCH monitoring on occasion other than the predefined intervals.

The signal power parameters of the cell may be measured by the 5G UE 101 using known signal measurement procedures. The signal power parameters of the cell may comprise Reference Signal Received Power (RSRP), Reference Signal Received Quality (RSRP), and the like. Further, the 5G UE 101 may determine the VoNR support and the plurality of cell parameters for each cell camped on by the 5G UE 101. Further, the 5G UE 101 may prioritize each cell based on the power-saving features, the signal power parameters, and the like. The priority may be based on number of power-saving features of each cell. For example, a first cell camped on by the 5G UE may support a power-saving feature. A second cell camped on by the 5G UE may support three power-saving features. The second cell may be prioritized over the first cell. In another example, the signal power measured for the first cell may exceed the signal power measured for the second cell. The first cell may be prioritized over the second cell.

At operation 502, the 5G UE 101 may record the Voice over New Radio (VoNR) support and the plurality of cell parameters for each cell camped on by the 5G UE 101. The 5G UE 101 may record the VoNR support and the plurality of cell parameters for each cell and may arrange the cells based on the priority for generating the list. The list may further comprise the cell details of each cell.

Figure 5B:
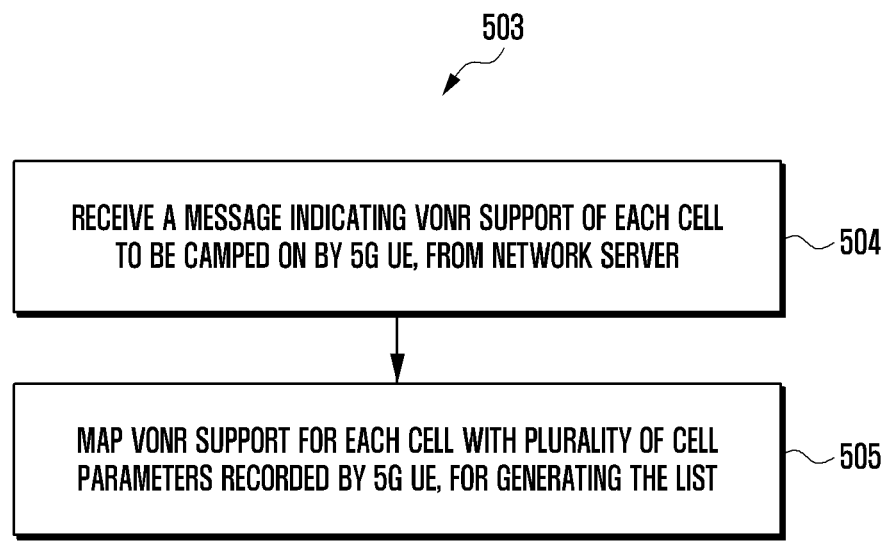

FIG. 5B shows a flow chart 503 illustrating method operations for generating the list by the 5G UE 101 based on the information provided by the network server according to an embodiment of the disclosure.

Referring to FIG. 5B, at operation 504, the 5G UE 101 may receive a message indicating the voice support of each cell to be camped on by the 5G UE 101, from the network server. The message may be included as an Information Element (IE) in a System Information Block (SIB) during RRC messaging. A message is shown in Table 1 below. In a first example, the VoNR support of a cell is indicated in the message. In another example, the message may include values to indicate the VoNR support. For example, a value "00" may indicate Voice over Packet-Switched (VoPS) support, a value "01" may indicate that the VoPS is supported via the VoLTE, and a value "10" may indicate the VoPS is supported via the VoNR.

may comprise a time-based validity associated with each of the one or more VoNR cells 103 and the one or more non-VoNR cells 104 recorded in the list. The voice support, the plurality of cell parameters, and the like associated with each cell may be changed after a certain period. The time-based validity indicates whether an entry in the list associated with the cell is updated with the changes. The entry in the list associated with a cell from the one or more VoNR cells and the one or more non-VoNR cells 104 may be updated based on the time-based validity, when the 5G UE 101 camps on the cell. The time-based validity may be hours, days, weeks, etc. For example, the entry may be updated a month before a call. In an embodiment, recently updated cell may be prioritized over a cell which is not updated recently. The voice support and the plurality of cell parameters of the cell may have been changed. The time-based validity may be marked as stale in the list. Further, the entry may be updated next time the 5G UE 101 camps on the same cell. The time-based validity may be marked as valid in the list after updating the entry.

Referring back to FIG. 3, at operation 303, the 5G UE 101 performs one of the following steps, based on the event, (i) selecting a VoNR cell when only one VoNR cell is available; (ii) identifying and selecting a VoNR cell based on the plurality of cell parameters, when the plurality of VoNR cells are available; and (iii) identifying and selecting a non-VoNR cell from the one or more non-VoNR cells, based on the plurality of cell parameters, when one of non-VoNR cell is available.

TABLE 1

| Proposed SIB1 contents -1 | Proposed SIB1 contents -1 |
|---|---|
| SIB1 message<br>--ASN1START<br>--TAG-SIB1-START<br>SIB1::=SEQUENCE{<br>...<br>si-Schedulinginfo SI-Schedulinginfo OPTIONAL, --Need R<br>ServingCellConfigCommon<br>ServingCellConfigCommonSIB OPTIONAL,--Need R<br>ims-EmergencySupport ENUMERATED {true} OPTIONAL, --Need R<br>eCallOverIMS-Support ENUMERATED {true} OPTIONAL, --Cond Absent<br>ims_VoPS_n3gpp ENUMERATED {true} OPTIONAL<br>ims_VoPS_3gpp ENUMERATED {true} OPTIONAL<br>ims_VoNR_support ENUMERATED {true} OPTIONAL<br>ue-TimersAndConstants UE-TimersAndConstants OPTIONAL, --Need R | SIB1 message<br>--ASN1START<br>--TAG-SIB1-START<br>SIB1::=SEQUENCE{<br>...<br>si-Schedulinginfo SI-Schedulinginfo OPTIONAL, --Need R<br>ServingCellConfigCommon<br>ServingCellConfigCommonSIB OPTIONAL,--Need R<br>ims-EmergencySupport ENUMERATED {true} OPTIONAL, --Need R<br>eCallOverIMS-Support ENUMERATED {true} OPTIONAL, --Cond Absent<br>ims_VoPS_n3gpp ENUMERATED {true} OPTIONAL<br>ims_VoPS_3gpp Bitstring {2}<br>ue-TimersAndConstants UE-TimersAndConstants OPTIONAL, --Need R<br>-----------------------------------<br>ims_VoPS_3gpp Bitstring {2}<br>0 0-VoPS not supported<br>0 1-VoPS supported via VoLTE<br>1 0-VoPS supported via VoNR<br>1 1-Reserved |

At operation 505, the 5G UE 101 may map the voice support for each cell with the plurality of cell parameters recorded by the 5G UE 101, for generating the list. The 5G UE 101 records the plurality of cell parameters as explained in FIG. 5A. The 5G UE 101 may generate the list by mapping the voice support of each cell with the plurality of cell parameters recorded by the 5G UE 101.

FIG. 5C shows a list generated by the 5G UE 101 according to an embodiment of the disclosure. The list comprises the cell details, the voice support, and the plurality of cell parameters, of the one or more VoNR cells 103 and the one or more non-VoNR cells 104. Further, the list Referring to the step (i), the 5G UE 101 may detect the availability of only one VoNR cell for using the voice services. The only one VoNR cell available may be the serving cell 102 or a VoNR cell in the vicinity of the serving cell 102. In an example, the serving cell 102 may have the VoNR support. The 5G UE 101 may detect one or more non-VoNR cells 104 in the vicinity of the serving cell 102. However, the 5G UE 101 may not detect any VoNR cell. The only VoNR cell available is the serving cell 102. Hence, the 5G UE 101 may select the serving cell 102 i.e., remain on the serving cell 102 for using the voice services. In another example, the serving cell 102 may not have the VoNR support. The 5G UE 101 may detect only one VoNR cell in the vicinity of the serving cell 102. Since only one VoNR cell is available in the vicinity and the serving cell 102 does not have the VoNR support, the 5G UE 101 may select the one VoNR cell available in the vicinity of the serving cell 102.

Referring to the step (ii), the 5G UE 101 identifies and selects a VoNR cell based on the plurality of cell parameters, when a plurality of VoNR cells are available. The plurality of VoNR cells may comprise the serving cell 102 and the plurality of VoNR cells in the vicinity of the serving cell 102, when the serving cell 102 has the VoNR support. The plurality of VoNR cells may comprise only the plurality of VoNR cells in the vicinity of the serving cell 102, when the serving cell 102 does not have VoNR support. The 5G UE 101 identifies and selects one VoNR cell from the plurality of VoNR cells based on the plurality of cell parameters of the plurality of VoNR cells. The 5G UE 101 may determine the plurality of cell parameters from the list. For example, the plurality of VoNR cells may comprise cell A and cell B. The cell A may support the BWP switching feature. The cell B may support the CDRX and the BWP switching feature. In an embodiment, the VoNR cell may be selected based on number of power-saving features, signal power parameters, and time-based validity associated with each of the plurality of VoNR cells. Referring to the above-stated example, the cell B is selected since the cell B support 2 power saving features. In another example, cell A may support the BWP switching feature, the CDRX, and the SPS, and RSRP may be −100 dBm. Cell B may support only the BWP switching feature and the CDRX, and RSRP may be −80 dBm. Cell B is selected since the cell B has better RSRP. In another example, both cell A and cell B may support the BWP switching feature, the CDRX, the SPS. However, the entry of Cell A may have been updated 5 days ago, and entry of Cell B may have been updated 3 days ago. Cell F is selected due to recent time-based validity updating.

Figure 6A:
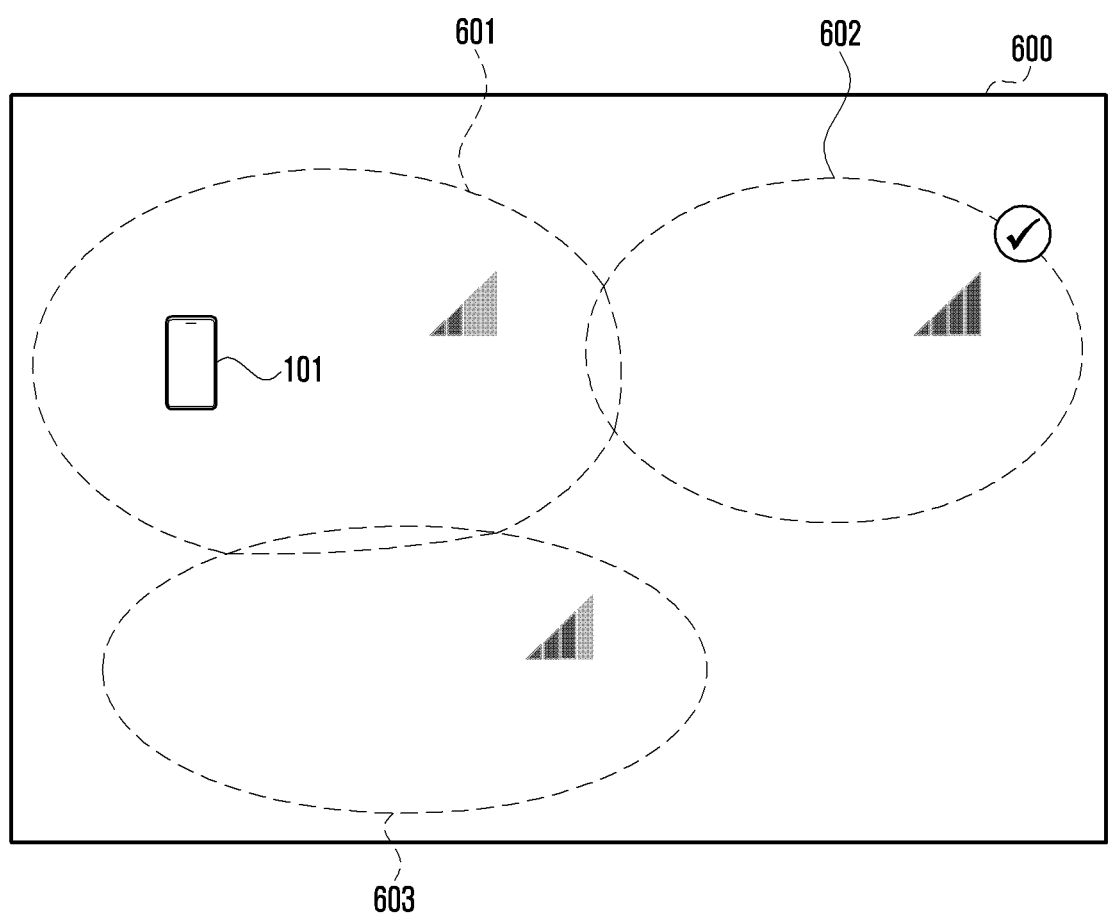
FIGS. 6A and 6B show various illustrations for selection of a VoNR cell using a 5G UE, according to various embodiments of the disclosure.
Figure 6B:
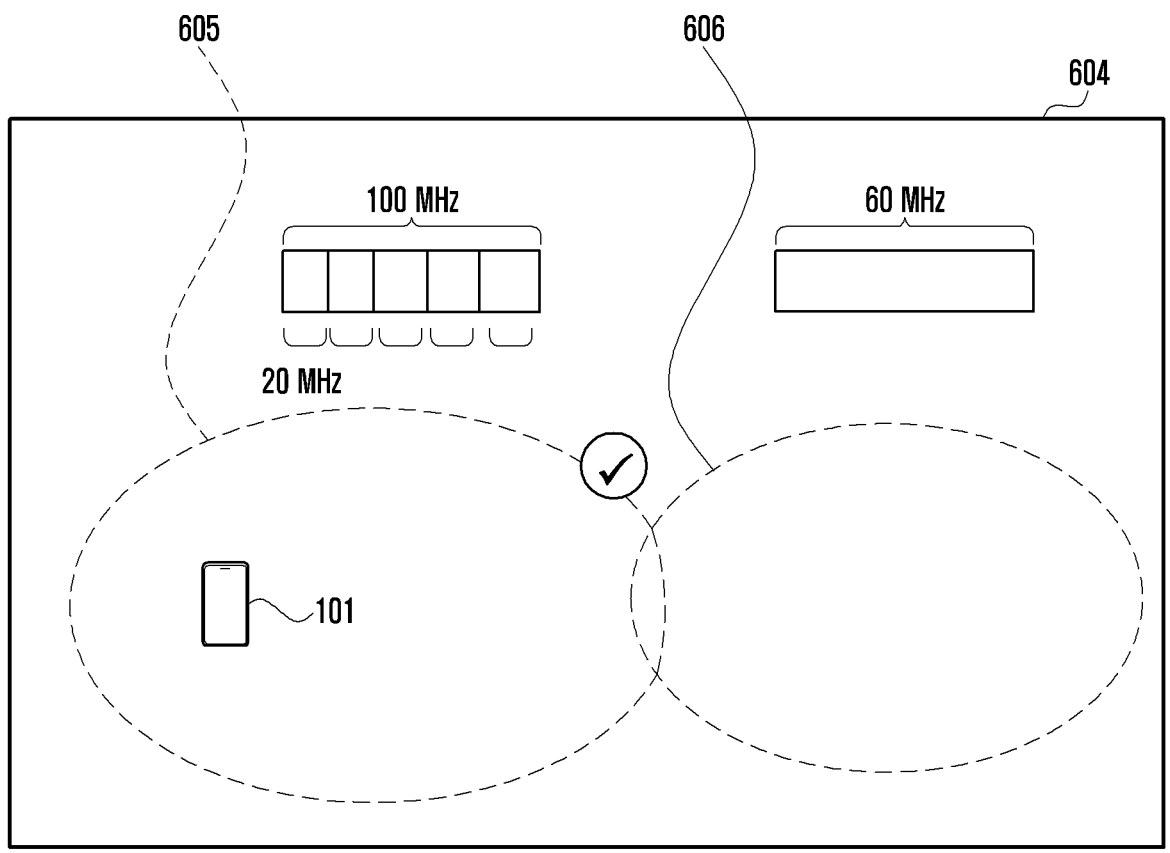

FIGS. 6A and 6B show various illustrations for selection of a VoNR cell using a 5G UE, according to various embodiments of the disclosure.

Referring to example 600 shown in FIG. 6A, three VoNR cells 601, 602, and 603 may be detected. The signal strength associated with the VoNR cells 601, 602, and 603 are indicated using the network symbol in the FIG. 6A. As can be seen, the signal strength of the VoNR cell 602 is greater than the signal strength of the VoNR cells 601 and 603. The VoNR cell 601 may support the BWP switching feature, the CDRX, and the SPS. Further, the VoNR cell 602 and 603 may support the BWP switching feature and the CDRX. The VoNR cell 602 may be selected over the VoNR cell 601, since the VoNR cell has the better signal strength.

Referring to example 604 shown in FIG. 6B, the 5G UE 101 may be camped on a serving cell 605. Further, availability of a VoNR cell 606 may be detected in vicinity of the serving cell 605. The serving cell 605 may support 100 MHz bandwidth. Further, the serving cell 605 may support the BWP switching feature. The network server might initially configure 100 MHz, but later can switch the 5G UE 101 to lower bandwidth such as 5 MHz or 20 MHz (as shown in the FIG. 6B). The switching may be performed as call services might not require huge bandwidth usage. The VoNR cell 606 may support 60 MHz bandwidth. However, the VoNR cell 606 may not support the BWP switching feature. When the 5G UE 101 camps on the VoNR cell 606, the 5G UE 101 will monitor entire 60 MHz bandwidth and the resultant power usage might be higher than the power usage in the serving cell 605. Hence, the 5G UE 101 may remain on the serving cell 605.

Referring to the step (ii), the 5G UE 101 identifies and selects a non-VoNR cell from the one or more non-VoNR cells 104, when one of, non-VoNR cell is available and based on the event. In an example, the 5G UE 101 may not detect any VoNR cell. Further, the serving cell 102 also may not have VoNR cells. The 5G UE 101 may select one non-VoNR cell from the one or more non-VoNR cells 104, based on the plurality of cell parameters. For example, the signal strength of the serving cell 102 may be less than a non-VoNR cell in the vicinity of the serving cell 102. The serving cell 102 may support the CDRX. However, the non-VoNR cell in the vicinity may be selected, since the non-VoNR cell has better signal strength. In another example, the 5G UE 101 may detect the one or more VoNR cells 103 and the one or more non-VoNR cells 104 in vicinity of the serving cell 102. The 5G UE 101 may select a non-VoNR cell from the one or more non-VoNR cells 104, based on the event. The event may indicate a requirement to select the non-VoNR cell. For example, a data-centric UE may have a requirement to always latch onto a non-VoNR cell to avoid network congestion. The data-centric UE may be a tablet. In such cases, the 5G UE 101 may select a non-VoNR cell from the one or more non-VoNR cells 104.

Reference is made to the scenario 204 of FIG. 2B explained above. The 5G UE 101 is camped on to the 5G cell or 4G LTE cell and has an ongoing VoWi-Fi call. When the 5G UE 101 is moving out of the Wi-Fi coverage, the 5G UE 101 identifies that Wi-Fi signal will be lost soon, based on client thresholds set on the 5G UE 101. The client threshold may be set based on operator requirement or may be determined by the 5G UE 101 by learning over a period of time. Using the embodiments of the disclosure, the 5G UE 101 detects the availability of the one or more VoNR cells 103. Further, the 5G UE 101 identifies and selects a VoNR cell based on the plurality of parameters. Hence, the 5G UE 101 can select and camp to a VoNR cell before the Wi-Fi signal is lost.

Figure 7:
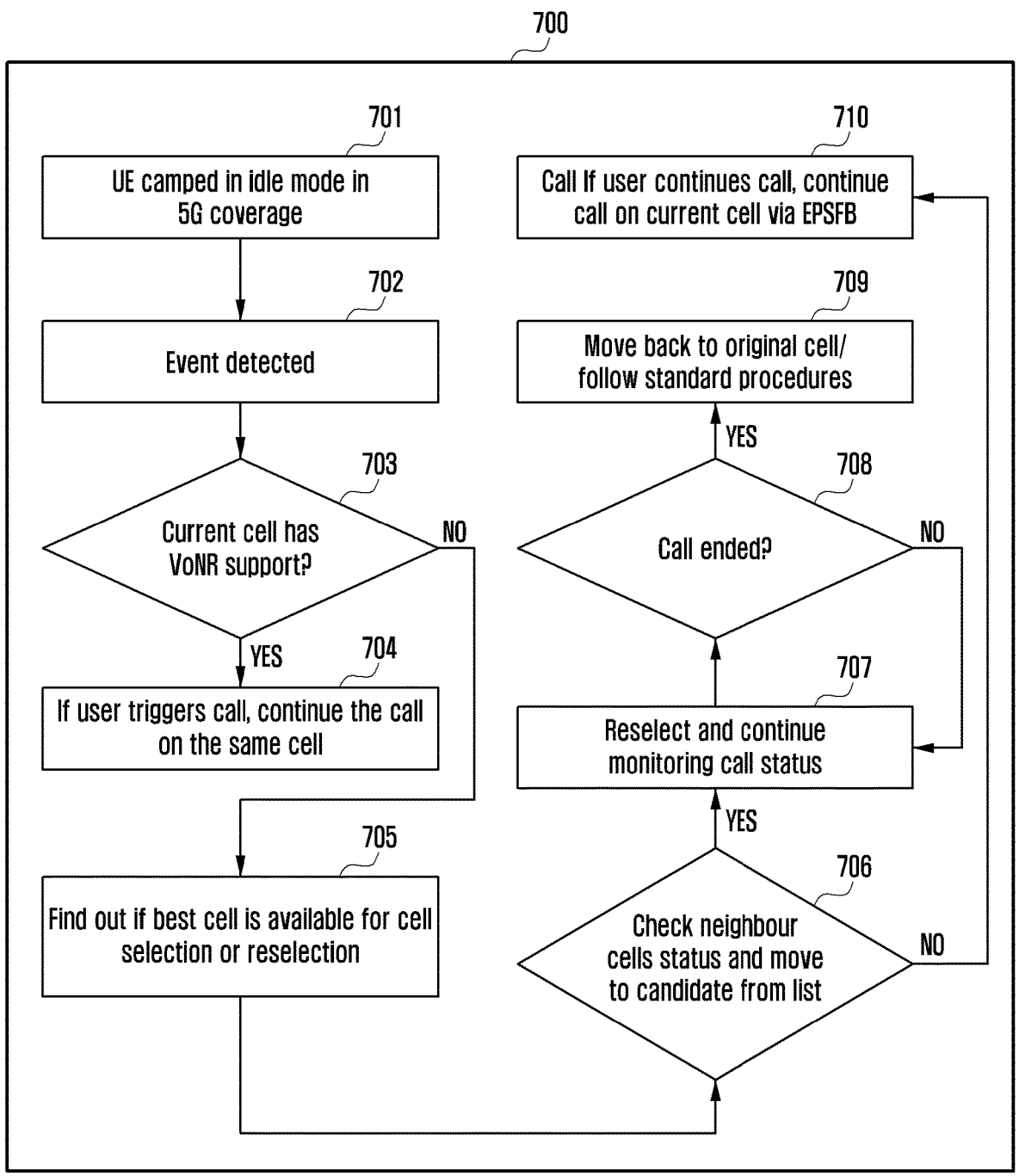
FIGS. 7 and 8 illustrates selecting cell using a 5G UE, when the 5G UE is in an idle mode and connected mode, respectively, according to various embodiments of the disclosure.
Figure 8:
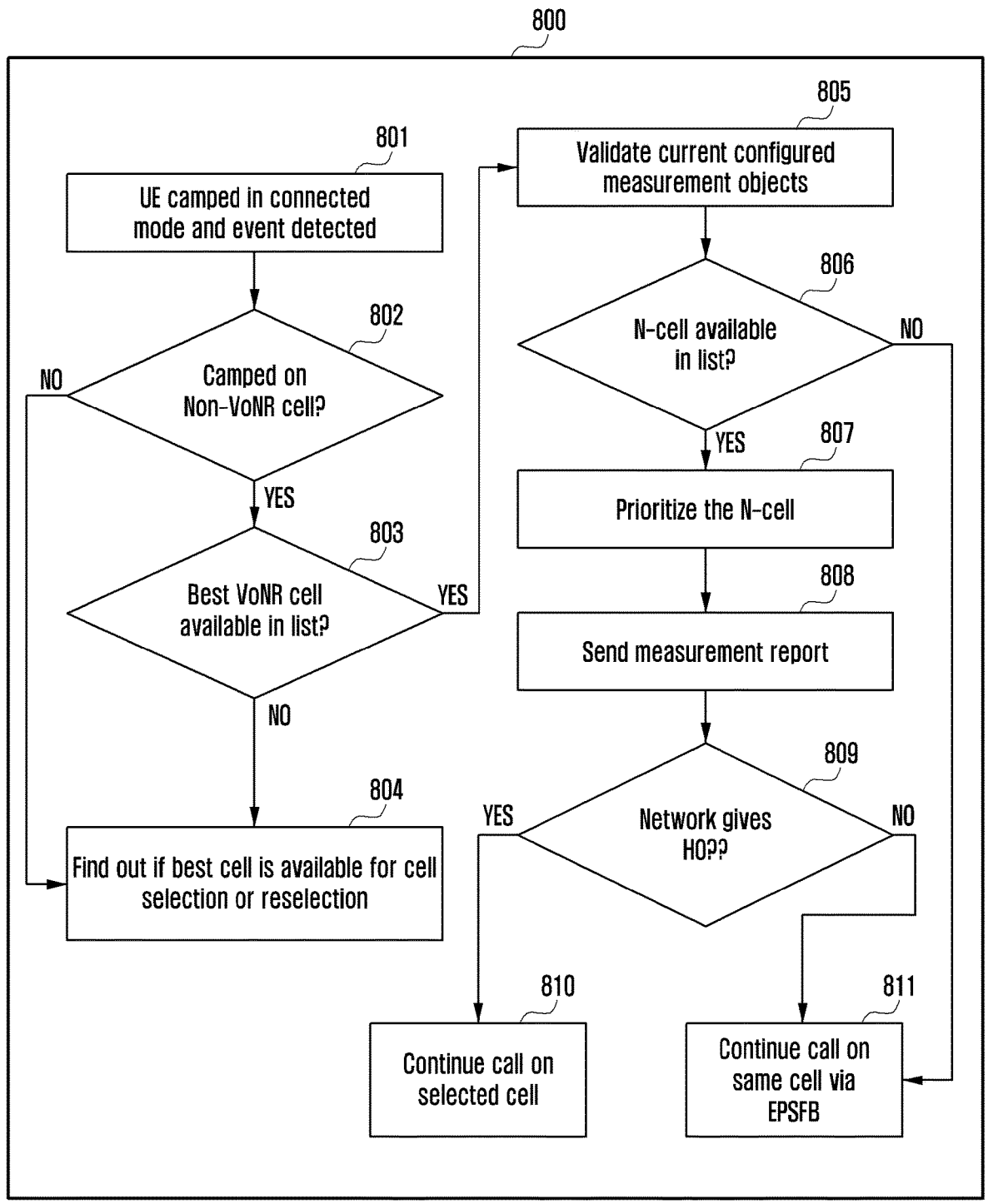

FIGS. 7 and 8 illustrates selecting cell using a 5G UE, when the 5G UE is in an idle mode and connected mode, respectively, according to various embodiments of the disclosure.

Referring to FIG. 7, it illustrates a flow chart 700 with operations for selecting cell using the 5G UE 101, when the 5G UE 101 is in an idle mode. At operation 701, the 5G UE 101 is camped in the serving cell 102 in the idle mode. At operation 702, the event is detected. At operation 703, the 5G UE 101 determines whether the serving cell 102 (referred as current cell in FIG. 7) has the VoNR support. When the serving cell 102 has the VoNR support, a call is continued on the serving cell 102 at operation 704. When the serving cell 102 does not have the VoNR support, the 5G UE 101 detects the availability of the one or more VoNR cells 103 for cell selection or reselection, at operation 705. At operation 706, the 5G UE 101 determines the plurality of cell parameters of the one or more VoNR cells 103 in the vicinity (referred as check neighbor cells status) of the serving cell 102. When no suitable cell is found, the call is continued on the serving cell 102 via EPSFB, at operation 710. At operation 707, the cell reselection to the selected cell is performed. Further, call status is monitored. At operation 708, the 5G UE 101 determines whether the call is ended. The 5G UE 101 may also determine whether the call was triggered or not after detecting the event. If the call is not ended, then monitoring the call status is continued. At operation 709, the 5G UE 101 moves back to original cell once the call is ended. In an example, the 5G UE 101 may follow standard procedures of mobility/selection of cells in order to avoid load on the VONR supported cell.

Referring to FIG. 8, it illustrates a flow chart 800 with operations for selecting cell using the 5G UE 101, when the 5G UE 101 is in a connected mode. At operation 801, the 5G UE 101 is camped in connected mode in the serving cell 102 and the event is detected. At operation 802, the 5G UE determines whether the serving cell 102 has the VoNR support. When the serving cell 102 has the VoNR support, the call is continued on the serving cell 102, at operation 804. At operation 803, the 5G UE 101 determines whether other VoNR cells better than the serving cell 102 is available in the list. When the serving cell 102 is selected as the best cell, the call is continued on the serving cell 102, at operation 804. When a VoNR cell better than the serving cell 102 is identified, the 5G UE 101 begins measurement procedures, at operation 805. At operation 806, the 5G UE 101 detects the one or more VoNR cells 103 from one or more network-configured cells, based on the list. The one or more network-configured cells is transmitted by the network server to the 5G UE 101. Further, the 5G UE 101 identifies and selects the VoNR cell from the one or more VoNR cells 103 based on the plurality of cell parameters, at operation 807. At operation 808, the 5G UE 101 transmits a measurement report corresponding to selected network-configured cell to the network server, for cell mobility. In one example, signal condition in the selected network-configured cell may be better compared to other network-configured cells. The 5G UE 101 transmits the measurement report of the selected cell to the network server. In another example, the signal condition in a network-configured cell may be better compared to selected network-configured cell by some small value. Hence, the selected network-configured cell may be desirable. The 5G UE 101 may transmit the measurement report indicating that the selected network-configured cell has better signal condition to the network server. In another example, the 5G UE 101 may transmit the measurement report only for the selected network-configured cell. At operation 809, the 5G UE 101 determines whether handover is received from the network server. At operation 810, the call is continued on the selected network-configured cell, upon receiving the handover from the network server. At operation 811, the call is continued on the serving cell 102 via EPSFB, when the network server doesn't provide the handover.

Figure 9A:
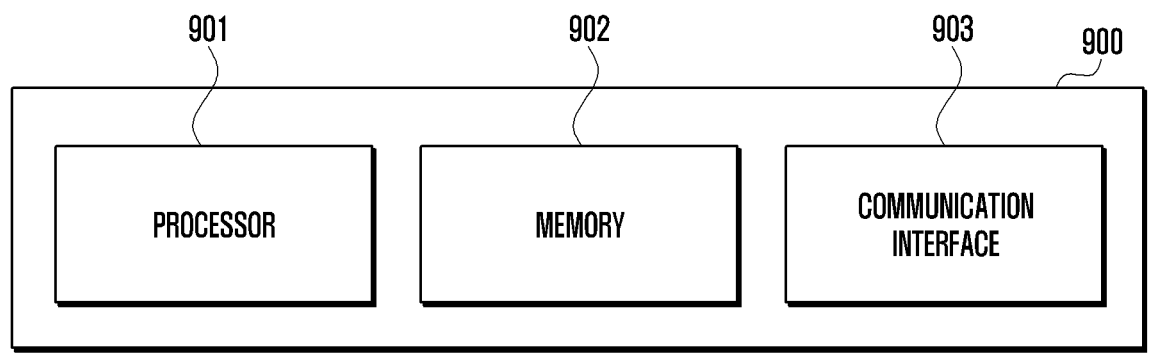
FIGS. 9A and 9B illustrates overview architecture of a 5G UE for selecting a cell using a 5G UE, according to various embodiments of the disclosure.

FIG. 9A illustrates overview architecture 900 of the 5G UE 101 for selecting the cell using the 5G UE 101, according to an embodiment of the disclosure.

Referring to FIG. 9A, the 5G UE 101 may comprise a processor 901, a memory 902, and a communication interface 903. In some embodiments, the memory 902 may be communicatively coupled to the processor 901. The memory 902 stores instructions executable by the processor 901. The processor 901 may comprise at least one data processor for executing program components for executing user or system-generated requests. The memory may be communicatively coupled to the one or more processors. The memory stores instructions, executable by the one or more processors, which, on execution, may cause the processor 901 to select the cell using the 5G UE 101. The communication interface 903 is configured to transmit and receive messages/signals/control signaling. For example, the communication interface 903 may be configured to transmit the measurement report to the network server. The communication interface 903 may be configured to receive the message from the network server.

Figure 9B:
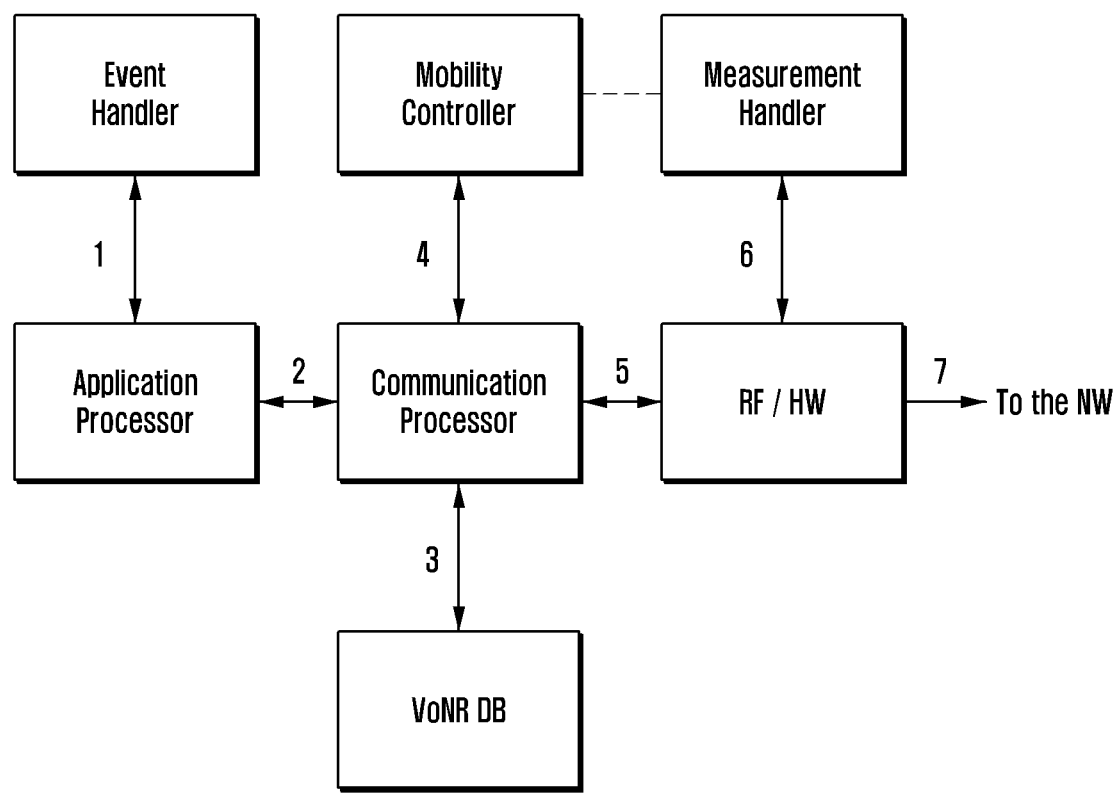

Further, the 5G UE 101 may comprise sub-modules such as event handler, application processor, communication processor, mobility controller, VoNR database, measurement handler, Radio Frequency module and other hardware modules, as shown in FIG. 9B.

Referring to FIG. 9B, the event handler may be configured to detect the events. The application processor may be configured to detect availability of the one or more VoNR cells 103 and the one or more non-VoNR cells in vicinity of the serving cell 102 based on the list in the VoNR database. Further, the application processor may be configured to identify and select one of, the VoNR cell and the non-VoNR cell, based on the event. These sub-modules are enhanced to support the selection of the cell using the 5G UE 101.

The disclosure provides a method for selecting optimized cell using the 5G UE. Hence, the 5G UE can determine a cell that supports VoNR services and camp on to the cell. This avoids latency caused by the EPSFB and associated call drop.

Further, the disclosure provides method to select a cell based on cell parameters associated with the cell such as power-saving features, signal power parameters, and the like. Hence, power saving is optimized by selecting the cell based on the power-saving features.

The disclosure provides flexibility to the 5G UE in the cell selection. The 5G UE can easily prioritize the cells that have VoNR support and camp on them to avoid unintended delay/latency introduced during voice services.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 4A, 5A, and 6B show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method of a user equipment (UE), the method comprising:
    generating, by the UE, a list comprising voice support, a plurality of cell parameters, and cell details of voice over new radio (VoNR) cells and non-VoNR cells, wherein the plurality of cell parameters comprises power-saving features associated with corresponding cells, wherein the power-saving features of the list includes a bandwidth part (BWP) switching feature, a connected mode discontinuous reception (CDRX) feature, and a semi-persistent scheduling (SPS) feature;
    storing, by the UE, the list in a memory of the UE;
    while the UE is camped on a serving cell, detecting, by the UE, an event among a set of events indicating a requirement for voice services;
    in response to detecting the event while being camped on the serving cell, detecting, by the UE, that an availability of one or more VoNR cells and one or more non-VoNR cells in vicinity of the serving cell is based on the list; and
    in response to detecting, by the UE, that at least one VoNR cell is available, selecting a VoNR cell based on a priority for selecting the VoNR cell,
    wherein the priority is determined based on a number of power-saving features of each of the at least one VoNR cell,
    wherein the number of power-saving features of each of the at least one VoNR cell includes the BWP switching feature, the CDRX feature, and the SPS feature, and
    wherein the BWP switching feature is utilized for dividing bandwidth of the VoNR cell to use smaller bandwidth, the CDRX feature is utilized for allowing sleep at pre-defined periodic intervals when no downlink data is allocated, and the SPS feature is utilized for using allocated resources periodically.

2. The method of claim 1, wherein, based on the serving cell having a VoNR support, a plurality of VoNR cells comprises the serving cell and the plurality of VoNR cells in the vicinity of the serving cell.

3. The method of claim 1,
    wherein the list further comprises a time-based validity associated with each of the one or more VoNR cells and the one or more non-VoNR cells, and
    wherein the method further comprises:
        in response to the UE camping on a cell, updating an entry in the list associated with the cell from the one or more VoNR cells and the one or more non-VoNR cells based on the time-based validity.

4. The method of claim 1, wherein one of the VoNR cell or a non-VoNR cell is selected based on at least one of the number of power-saving features, signal power parameters, or a time-based validity associated with one of each of the one or more VoNR cells or each of the one or more non-VoNR cells.

5. The method of claim 1,
    wherein the UE is in one of an idle mode or a connected mode, and
    wherein the method further comprises:
        while the UE is in the idle mode, identifying one of the VoNR cell or a non-VoNR cell for cell selection or reselection in response to detecting the event.

6. The method of claim 5, wherein the method comprises:
    while the UE is in the connected mode, detect one of the one or more VoNR cells or the one or more non-VoNR cells from one or more network-configured cells based on the list stored in the UE;
    identify and select one of the VoNR cell or the non-VoNR cell from one of the one or more VoNR cells or the one or more non-VoNR cells; and
    transmit a measurement report corresponding to the selected one of the VoNR cell or the non-VoNR cell to a network server, for cell mobility, for receiving handover to the selected one of the VoNR cell or the non-VoNR cell from the network server.

7. A user equipment (UE) comprising:
    a communication interface;
    a memory; and
    a processor configured to:
        generate a list comprising voice support, a plurality of cell parameters, and cell details of voice over new radio (VoNR) cells and non-VoNR cells, wherein the plurality of cell parameters comprises power-saving features associated with corresponding cells, wherein the power-saving features of the list includes a bandwidth part (BWP) switching feature, a connected mode discontinuous reception (CDRX) feature, and a semi-persistent scheduling (SPS) feature,
        store the list in the memory,
        while the UE is camped on a serving cell, detect an event among a set of events indicating a requirement for voice services,
        in response to detecting the event while being camped on the serving cell, detect that an availability of one or more VoNR cells and one or more non-VoNR cells in vicinity of the serving cell is based on the list, and
        in response to detecting, by the UE, that at least one VoNR cell is available, select a VoNR cell based on a priority for selecting the VoNR cell among the at least one VoNR cell,
    wherein the priority is determined based on a number of power saving features of each of the at least one VoNR cell,
    wherein the number of power-saving features of each of the at least one VoNR cell includes the BWP switching feature, the CDRX feature, and the SPS feature, and
    wherein the BWP switching feature is utilized for dividing bandwidth of the VoNR cell to use smaller bandwidth, the CDRX feature is utilized for allowing sleep at pre-defined periodic intervals when no downlink data is allocated, and the SPS feature is utilized for using allocated resources periodically.

8. The UE of claim 7, wherein, based on the serving cell having VoNR support, a plurality of VoNR cells comprise the serving cell and the plurality of VoNR cells in the vicinity of the serving cell.

9. The UE of claim 7,
wherein the list further comprises a time-based validity associated with each of the one or more VoNR cells and the one or more non-VoNR cells, and
wherein the processor is further configured to:
in response to the UE camping on a cell, update an entry in the list associated with the cell from the one or more VoNR cells and the one or more non-VoNR cells based on the time-based validity.

10. The UE of claim 7, wherein the processor is further configured to:
select one of the VoNR cell or a non-VoNR cell based on at least one of the number of power-saving features, signal power parameters, or a time-based validity associated with one of each of the one or more VoNR cells or each of the one or more non-VoNR cells.

11. The UE of claim 7,
wherein the UE is in one of an idle mode or a connected mode, and
wherein the processor is further configured to:
while the UE is in the idle mode, identify one of the VoNR cell or a non-VoNR cell for cell selection or reselection in response to detecting the event.

12. The UE of claim 11, wherein the processor is further configured to:
while the UE is in the connected mode, detect one of the one or more VoNR cells and the one or more non-VoNR cells from one or more network-configured cells based on the list stored in the memory of the UE,
identify and select one of the VoNR cell or the non-VoNR cell from the one or more VoNR cells and the one or more non-VoNR cells, and
transmit a measurement report corresponding to the selected one of the VoNR cell or the non-VoNR cell to a network server, for cell mobility, for receiving handover to the selected one of the VoNR cell or the non-VoNR cell from the network server.

13. The method of claim 1,
wherein the event consists of one of a scrolling through a call history of the UE, an opening of a contact list and searching for a name in the contact list, an unlocking of the UE and viewing missed call notifications, a user receiving an event reminder, or a searching being performed using a browser application, and
wherein the method further comprises:
in response to detecting the event consisting of one of the scrolling through the call history of the UE, the opening of the contact list and searching for the name in the contact list, the unlocking of the UE and viewing missed call notifications, the user receiving the event reminder, or the searching being performed using the browser application while being camped on the serving cell, detecting, by the UE, that the availability of the one or more VoNR cells and the one or more non-VoNR cells in vicinity of the serving cell is based on the list.

14. The method of claim 1,
wherein the event is detected based on a user interacting with at least one application of the UE prior to initiating use of the voice services, and
wherein the method further comprises:
in response to the event being detected based on the user interacting with the at least one application of the UE prior to initiating use of the voice services while being camped on the serving cell, detecting, by the UE, that the availability of the one or more VoNR cells and the one or more non-VoNR cells in vicinity of the serving cell is based on the list.

15. The method of claim 1, further comprising:
receiving, from a network server after camping on the serving cell, a radio resource control (RRC) configuration message including the power-saving features of the serving cell.

* * * * *